Feb. 23, 1954 — J. N. BAKER — 2,670,195
ELECTRIC SCALE
Filed Jan. 10, 1945
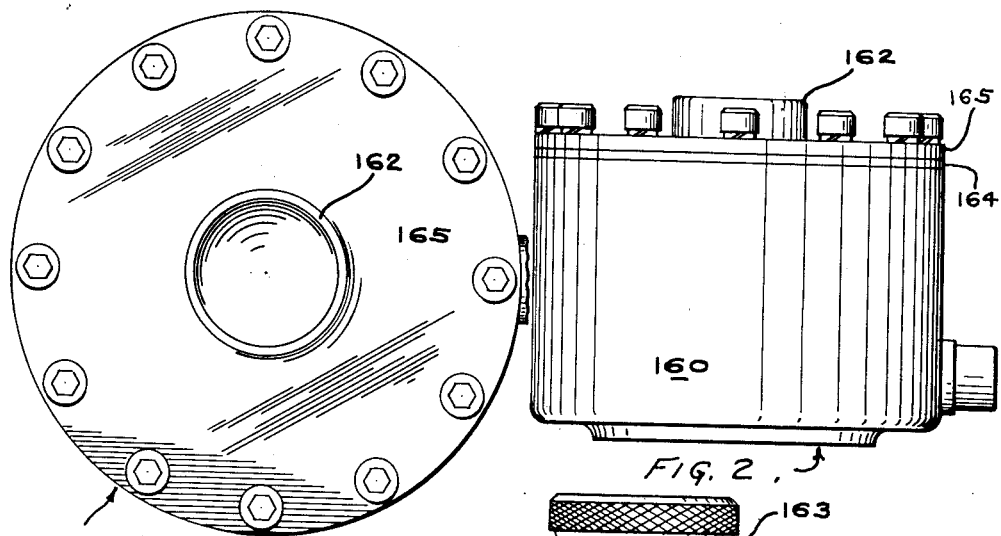
Fig. 3. Fig. 2.
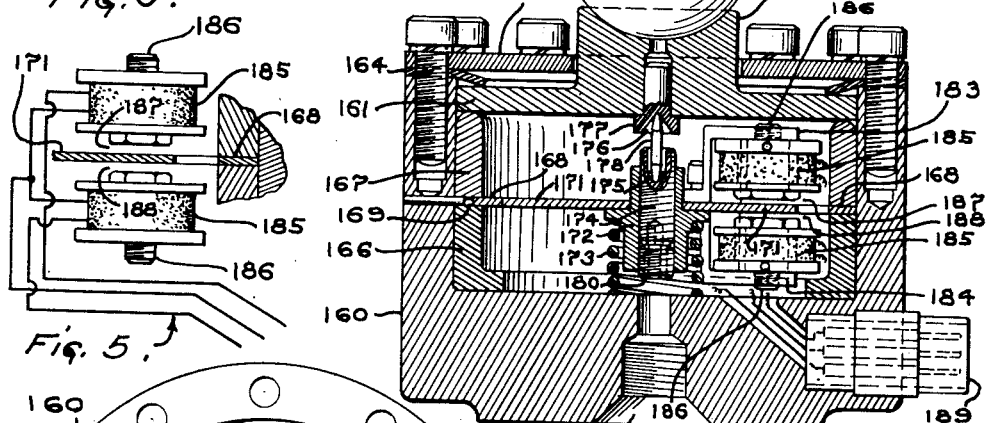
Fig. 5. Fig. 1. Fig. 6.
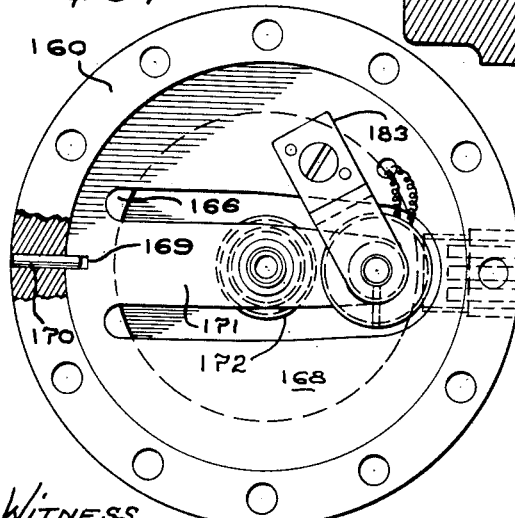
Fig. 4.
Inventor
JAMES N. BAKER,
Attorney Patented Feb. 23, 1954

2,670,195

UNITED STATES PATENT OFFICE 2,670,195

ELECTRIC SCALE

James N. Baker, Baltimore County, Md., assignor to The Black and Decker Manufacturing Company, a corporation of Maryland Application January 10, 1945, Serial No. 572,179

3 Claims. (Cl. 265—70)

The object of this invention is to produce a weighing device which is extremely light in weight and capable of weighing heavy loads with a high degree of accuracy. The device is particularly suited for use in weighing trucks and buses upon the highways and its light weight makes it most convenient to transport from place to place in a car of the officer of the highway patrol. Its light weight makes it ideal for the weighing of aircraft especially where it is necessary to transport the device from one flight field to another.

In the design of present units used for these purposes a system of levers has been used to bring the load being weighed within the range of the indicating device. The load is then the product of the balancing weight and the total movement of the system of levers. The indicating device is calibrated to show the load upon the scale platform. In a system of levers of this type any change, however slight, in the combined lever movement, such as would be produced by a distortion of the base of the unit would materially affect the accuracy of the weight indication. In order to reduce to a minimum the error due to this base distortion, it has been necessary to use an extremely heavy base. This is essential since there can be no fixed prepared foundation upon which to place the unit.

There is also the difficulty at times of reading the load indication, especially if there are overhanging projections, when it is necessary to resort to the use of a mirror. When several units have been used together it has been necessary to read them separately since there were no means of totalizing the load upon the several units.

The subject of this invention is a weighing device which is more adaptable, more portable and more easily read either as a unit or as a total of a plurality of units. The device may either take the form of a platform scale or of a cell scale which may be used in conjunction with a jack. The basic elements in the scale are the same whichever form they may be adapted to.

This application is directed to the cell type scale.

With the above stated objective in view a readily portable device for weighing relatively heavy loads, according to the present invention comprises a hollow container having a rigid vertical peripheral wall including a peripheral load sustaining portion, a flexing elastic load sustaining metal plate resting upon and flexing about the angle formed by the inner edge of said portion, a solid electrical conducting element associated with the under side of the plate, the flexing of the plate varying a current that may be passed through the element, a load centering means on the top of said plate located substantially centrally of the peripheral wall, and means permanently connecting the plate to the wall.

An arrangement as above stated may be used in a small compact weighing device adapted to a jack-type scale and could be termed a flat pellet or pancake or preferably a cell scale. It may be placed upon the top of any commercial jack between its head and the load to be weighed.

The accompanying drawings illustrate a practical embodiment of a cell-type scale constructed in accordance with the present invention.

In these drawings:

Figure 1 is an elevation partly in section of a fourth form of electro-magnet deflection detector applied to a cell type of scale or unit.

Figure 2 is a side elevational view thereof.

Figure 3 is a top plan view thereof.

Figure 4 is a plan view thereof with the bearing plate and holder rings removed.

Figure 5 is a fragmentary section of the electromagnetic units.

Figure 6 is a sectional view of the transfer pin pressure adjustor.

In Figures 1 to 6 inclusive is shown one form of electro-magnet cell type scale. This scale has a cup base 160 with a pressure plate 161 having thereon a boss 162 which has a socket therein for the head 163. The pressure plate 161 is held down by locking ring 164 and cover plate 165.

Within the base 160 are two bearing rings 166 and 167. The top edge of ring 167 is rounded to form a support for the pressure plate 161. Between the two bearing rings is a circular plate 168 held from turning by the notch 169 having the pin 170 passing therein through the side wall of base 160. A U-shaped section is cut from the center plate 168 leaving a tongue 171 projecting diametrically across the plate.

Beneath the center of pressure plate 161 this tongue 171 is provided with a boss 172 which is urged upwardly by the pressure spring 173. The boss is tapped to accommodate an adjusting screw 174, the upper end of which is provided with a pivot bearing socket 175. A pivot bearing socket 176 is also located in the hardened member 177 in the center of the pressure plate 161. Between the two pivot sockets is a transfer pin 178. With the pin in intimate contact with its two sockets, any deflection of pressure plate 161 will be transmitted to tongue 171. The vertical position of adjusting screw 174 can be fixed by wrench shank 179 in a socket placed axially of the screw from below. A lock nut 180 can likewise be forced into place by a wrench 181 from below. These wrenches work through the opening 182 provided in the bottom of the base 160 for the top of the jack.

Two S-shaped brackets 183 and 184 are screwed to opposed sides of plate 168, each of which supports a coil 185 at its outer extremity. These coils are attached to the brackets by studs 186. These coils face each other and are so located that the centers of the studs 186 line up opposite the center of the free extremity of tongue 171, the studs forming pole pieces and with the tongue forming air gaps 187 and 188. An outlet 189 is provided for the wires from the two coils.

When load is applied to the plate 161 its deflection or deformation is transmitted directly to tongue 171 and this movement of the tongue increases the upper air gap 187 and decreases the lower air gap 188. With the coils connected as shown in Figure 5, upon passing alternating current therethrough and to a suitable measuring means, the effect of the air gap change can be calibrated directly into pounds pressure upon the load plate 161.

The magnetomotive force causes magnetic lines of force to flow through the magnetic circuit. It is similar to a current flow created by voltage in an electric circuit. The magnetic flux is the number of lines of magnetic force set up in the magnetic substance and thus the flux becomes analogous to current flowing in an electric circuit. The magnetic flux is numerically equal to the driving force called magnetomotive force, divided by the reluctance of the circuit, which is a quality analogous to the resistance of an electric circuit. In the formula for calculating the flux in a magnetic circuit the air gap contributes by far the larger part of the reluctance when the poles and their connections are all iron or steel and consequently the flow of flux is greatly affected by variations in the width of the air gap.

The base of these units may be made of aluminum and likewise the top may be aluminum. The load plate and the gage plates and bearing rings and the like are preferably made of hardened steel to properly transmit the loads thereupon and to serve as parts of magnetic circuits.

It will of course be understood that various changes in details of construction and arrangement of parts may be made by those skilled in the art without departing from the spirit of the invention as set forth in the appended claims.

What is claimed as new and is desired to be secured by Letters Patent is:

1. A readily portable device for weighing relatively heavy loads, a hollow container having an upwardly directed rigid peripheral load sustaining portion, and a base inflexible in all directions, a flexing elastic load sustaining metal plate resting upon and flexing about the inner supporting edge of said portion, a flexing center member rigidly supported beneath said load sustaining plate, solid electrical impedance elements associated with both sides of the center member, the member and elements being between the plate and base, the flexing of the center member varying a current that may be passed through the elements, a load centering means on the top of said plate located substantially centrally on the plate positioned to receive the load to be weighed and means transferring load imparted flexing of said plate located substantially centrally of the means permanently connecting the plate and centering means to the container without restraint upon the flexing of the plate.

2. A readily portable device for weighing relatively heavy loads, a hollow container including a peripheral support, and a base inflexible in all directions, a flexing elastic load sustaining metal plate resting upon said support, a pair of spaced electro magnets with their cores substantially in line supported within said container beneath said plate and above the base, a movable armature movable in the space between said magnets, movements of the armature varying the currents that may be passed through said magnets, a load centering means on the top of said plate located substantially centrally of the plate positioned to receive the load to be weighed and means transferring load imparted flexing of said plate proportionately to the movement of said armature and means permanently connecting the plate and centering means to the container.

3. A readily portable device for weighing relatively heavy loads, a hollow container including a peripheral support and a base inflexible in all directions, a flexing elastic load sustaining metal plate resting upon said support, a pair of spaced electro magnets with their cores substantially in line supported within said container beneath said plate and above said base, a resilient armature mounted at one end adjacent the container side and extending across the container center and between said magnets, a load centering means on the top of said plate located substantially centrally of the plate positioned to receive the load to be weighed, movements of the armature varying the currents that may be passed through said magnets, and means substantially normal to the plate and centrally thereof transferring load imparted flexing of the plate proportionately to the movement of said armature, said movement being magnified by the extension of the armature beyond the transferring means to the magnets.

JAMES N. BAKER.

References Cited in the file of this patent

UNITED STATES PATENTS

| Number | Name | Date |
| --- | --- | --- |
| 1,708,333 | Smith | Apr. 9, 1929 |
| 1,718,494 | Shurig | June 25, 1929 |
| 1,772,188 | Mason | Aug. 5, 1930 |
| 1,897,811 | Martin | Feb. 14, 1933 |
| 1,953,819 | Payne | Apr. 3, 1934 |
| 1,972,578 | Wallichs | Sept. 4, 1934 |
| 2,050,106 | Lorig | Aug. 4, 1936 |
| 2,183,078 | Kemler | Dec. 12, 1939 |
| 2,213,982 | Frey | Sept. 10, 1940 |
| 2,266,608 | Kuehni | Dec. 16, 1941 |
| 2,297,679 | Allen | Oct. 6, 1942 |
| 2,298,216 | Lamberger | Oct. 6, 1942 |
| 2,336,500 | Osterberg | Dec. 14, 1943 |
| 2,360,886 | Osterberg | Oct. 24, 1944 |
| 2,362,626 | Giffen | Nov. 14, 1944 |
| 2,484,164 | Hathaway | Oct. 11, 1949 |
| 2,488,349 | Thurston | Nov. 15, 1949 |

FOREIGN PATENTS

| Number | Country | Date |
| --- | --- | --- |
| 457,295 | Great Britain | Nov. 25, 1936 |